United States Patent
Sarnowski et al.

(10) Patent No.: US 10,709,125 B2
(45) Date of Patent: Jul. 14, 2020

(54) ROD AND CUP HOLDER

(71) Applicant: GEM PRODUCTS, INC., Orange Park, FL (US)

(72) Inventors: Jason Sarnowski, Orange Park, FL (US); Erle Matthew Bridgewater, Orange Park, FL (US)

(73) Assignee: GEM Products, Inc., Jacksonville, FL (US)

( * ) Notice: Subject to any disclaimer, the term of this patent is extended or adjusted under 35 U.S.C. 154(b) by 499 days.

(21) Appl. No.: 15/724,873

(22) Filed: Oct. 4, 2017

(65) Prior Publication Data
US 2019/0098885 A1     Apr. 4, 2019

(51) Int. Cl.
*A01K 97/10* (2006.01)
*B63B 17/00* (2006.01)
*A47G 23/02* (2006.01)

(52) U.S. Cl.
CPC .......... *A01K 97/10* (2013.01); *A47G 23/0225* (2013.01); *B63B 17/00* (2013.01); *B63B 2017/0054* (2013.01)

(58) Field of Classification Search
CPC .................................................. A01K 97/10
USPC ...... 43/21.2; 248/311.2, 511, 523, 534, 535; 114/255, 364; 224/922
See application file for complete search history.

(56) References Cited

U.S. PATENT DOCUMENTS

| | | | | |
|---|---|---|---|---|
| 684,451 A | * | 10/1901 | Mowry | F16C 11/06 403/87 |
| 1,266,770 A | * | 5/1918 | Burton | A01K 97/10 248/540 |
| 2,130,650 A | * | 9/1938 | Peterson | A01K 97/10 248/514 |
| 2,360,402 A | * | 10/1944 | Determan | A01K 97/10 43/21.2 |
| 2,890,847 A | * | 6/1959 | Minton | A01K 97/10 248/534 |
| 3,259,346 A | * | 7/1966 | Rogers | A01K 97/10 248/518 |
| 4,062,299 A | * | 12/1977 | Smith | A01K 97/10 108/42 |
| 4,485,579 A | * | 12/1984 | Hawie | A01K 97/10 248/512 |
| 4,578,891 A | * | 4/1986 | Murray | A01K 97/10 43/21.2 |

(Continued)

FOREIGN PATENT DOCUMENTS

| | | | | |
|---|---|---|---|---|
| CA | 2390143 A1 | * | 12/2003 | ............. A01K 97/10 |
| CA | 2668240 A1 | * | 3/2010 | ............. A01K 97/10 |

(Continued)

*Primary Examiner* — Darren W Ark
(74) *Attorney, Agent, or Firm* — Seyfarth Shaw LLP (57) ABSTRACT

A combination cup and rod holder with an installation that does not require fasteners to be passed through a head of the holder. The combination cup and rod holder includes a holder portion with a head, a cup holder portion extending from the head, a tube, and a threaded portion extending at an angle from the cup holder portion. The combination cup and rod holder may also include a support that allows a force applied along the axis of the tube to affect a bottom of an installation surface parallel to the head, and a nut with threads that mate with the threaded portion. This allows the combination cup and rod holder to be used with a variable installation thickness.

8 Claims, 9 Drawing Sheets

(56) References Cited

U.S. PATENT DOCUMENTS

| | | | | |
|---|---|---|---|---|
| 4,682,438 A * | 7/1987 | Arrow | B63B 29/04 | 108/48 |
| 4,749,162 A * | 6/1988 | Wanzor | A01K 97/10 | 114/364 |
| 4,778,141 A * | 10/1988 | Bogar | A01K 97/10 | 248/538 |
| 4,836,127 A * | 6/1989 | Wille | A01K 97/10 | 114/343 |
| 4,919,316 A * | 4/1990 | Grauberger | A01K 97/10 | 224/406 |
| 5,065,540 A * | 11/1991 | Potter, Jr. | A01K 97/10 | 114/364 |
| 5,120,016 A * | 6/1992 | Dysarz | A01K 97/10 | 248/222.13 |
| 5,163,244 A * | 11/1992 | Rupp | A01K 97/11 | 248/514 |
| 5,301,451 A * | 4/1994 | VanAssche | A01K 91/08 | 43/21.2 |
| 5,813,163 A * | 9/1998 | Dysarz | A01K 97/10 | 211/70.8 |
| 5,987,803 A * | 11/1999 | White | A01K 97/10 | 43/21.2 |
| 6,045,109 A * | 4/2000 | Mashburn | A01K 97/10 | 248/511 |
| 6,318,017 B1 * | 11/2001 | Genardo | A01K 97/10 | 43/21.2 |
| 6,497,067 B1 * | 12/2002 | King | A01K 97/10 | 248/538 |
| D499,789 S * | 12/2004 | Bridgewater | D22/147 | |
| 6,907,642 B1 * | 6/2005 | Czipri | B63B 17/02 | 114/364 |
| 6,993,865 B2 * | 2/2006 | Peters | A01K 97/10 | 248/514 |
| 7,004,102 B2 * | 2/2006 | Sampson | A01K 97/10 | 114/364 |
| 7,200,967 B1 * | 4/2007 | Seaman | A01K 97/10 | 248/538 |
| D591,385 S * | 4/2009 | Baltes | D22/147 | |
| D591,386 S * | 4/2009 | Baltes | D22/148 | |
| D595,807 S * | 7/2009 | Baltes | D22/147 | |
| D607,963 S * | 1/2010 | Baltes | D22/147 | |
| 7,748,678 B2 * | 7/2010 | Camarota | B60N 3/101 | 248/311.2 |
| 8,033,046 B2 * | 10/2011 | Morehead | A01K 97/10 | 248/535 |
| 8,291,636 B2 * | 10/2012 | Wilcox | A01K 97/10 | 114/364 |
| 8,464,462 B2 * | 6/2013 | Streckert | A01K 97/10 | 43/21.2 |
| 8,640,377 B2 * | 2/2014 | Baltes | A01K 97/10 | 114/364 |
| 8,800,196 B2 * | 8/2014 | Baumann | A01K 97/10 | 248/534 |
| 8,800,197 B2 * | 8/2014 | Wilcox | A01K 97/10 | 114/364 |
| 8,881,668 B2 * | 11/2014 | Bragman | A01K 97/10 | 114/364 |
| 8,944,399 B2 * | 2/2015 | Sutherland | A01K 97/10 | 248/519 |
| 9,615,564 B2 * | 4/2017 | Liney | A01K 97/10 | |
| 2006/0086877 A1 * | 4/2006 | Cotton | A01K 97/10 | 248/311.2 |
| 2006/0261234 A1 * | 11/2006 | Taboada | B60N 3/103 | 248/314 |
| 2006/0277813 A1 * | 12/2006 | Saldana | A01K 97/10 | 43/21.2 |
| 2018/0177174 A1 * | 6/2018 | McQuade | F16B 9/026 | |

FOREIGN PATENT DOCUMENTS

| | | |
|---|---|---|
| JP | 2008301756 A * | 12/2008 |
| JP | 2014212761 A * | 11/2014 |

* cited by examiner

ROD AND CUP HOLDER

TECHNICAL FIELD OF THE INVENTION

The present invention relates generally to rod and cup holders. More particularly, the present invention relates to a combination rod and cup holder for a boat.

BACKGROUND OF THE INVENTION

Rod holders are popular in fishing and boating applications. Rod holders are typically rigid structures attached to an area of a boat, such as a wall, or installed in a mounting surface of a boat. Such rod holders allow a user to attend to other tasks, without having to continuously hold the fishing rod. Such rod holders are also commonly used in trolling applications as well, where a user places a lure in the water and then drives the boat at a slow speed to cause the lure to perform a swimming action to attract fish.

Cup holders are also typically found on boats for holding a beverage, such as a canned beverage, while boating or fishing. However, having numerous accessories installed in or around the boat can unnecessarily clutter the boat. Additionally, current rod holders and cup holders typically require installation by passing unsightly fasteners through a top or head of the rod holder, which can present leak issues, as well as provide an undesirable aesthetic appearance.

SUMMARY OF THE INVENTION

The present invention broadly comprises a combination cup and rod holder with that is installed without fasteners through a head of the holder. The combination cup and rod holder includes a holder portion with a head, a cup holder portion extending from the head, a tube, and an externally threaded portion extending at an angle from the cup holder portion (such as at about a 60, 75, or 90 degree angle between the tube and the head). The combination cup and rod holder also includes a support that allows a force applied along the axis of the tube to affect a bottom of an installation surface parallel to the head, and a nut with internal threads that threadingly engage the threaded portion.

The threaded portion is disposed in an aperture of an installation surface (e.g., hole in a boat side wall), with the head adjacent to a top of the surface. The support is disposed on the tube and adjacent to a bottom of the surface. The nut is then threaded and tightened onto the threaded portion to cause the support to abut the bottom of the surface, thereby sandwiching the surface between the nut and the head. This also allows the combination cup and rod holder to be used with a variable surface thickness.

In an embodiment, the present invention broadly includes a rod and cup holder. The rod and cup holder includes a cup holder portion with an aperture in a bottom of the cup holder portion, a flange coupled to an end of the cup holder portion opposite the aperture, and a tube coupled to the aperture that extends at an angle relative to the flange. A support is disposed around an external surface of the cup holder portion, and a fastener is disposed on the tube and adapted to cause the flange and support to compress an installation surface therebetween.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises a combination cup and rod holder that can be installed without fasteners passed through a head of the holder. In an embodiment, the combination cup and rod holder includes a holder portion with a head, a cup holder portion extending from the head, a tube, and an external threaded portion extending from the cup holder portion. In an embodiment, the tube extends at an angle from the cup holder portion (such as at an angle of about 60-90 degrees between the tube and the head). The combination cup and rod holder includes a support that allows a force applied along the axis of the tube to affect a bottom of an installation surface parallel to the head, and a nut with internal threads that matingly engage the threaded portion.

The threaded portion is disposed in an aperture of an installation surface (e.g., hole in a boat sidewall), with the underside of the head abutting a top of the surface. The support is disposed on the tube and adjacent to a bottom of the surface. The nut is then threaded onto the threaded portion to cause the support to abut the bottom of the surface, wherein the surface is sandwiched between the nut and the underside of the head. This also allows the combination cup and rod holder to be installed in surfaces having variable thickness.

Referring to FIGS. 1-9, in an embodiment, the combination rod and cup holder 100 includes a holder portion 102, a support 104, and a threaded fastener 106 (such as a nut having internal threads). The holder portion 102 includes a head 108, a cup holder portion 110 extending from the head 108, a tube 112, and an externally threaded portion 114. As illustrated, the head 108 has an oval type shape, however, the head 108 may have any other shape (such as circular, square, rectangular, triangular, etc.). The head 108 acts as a flange that abuts a top side of an installation surface in which the rod and cup holder 100 is installed.

The cup holder portion 110 extends from the head 108 and has a smaller diameter than that of the head 108. The cup holder portion 110 may be installed in an aperture in the installation surface in which the rod and cup holder 100 is installed. The cup holder portion 110 is adapted to hold a cup, bottle, can, or other beverage container. The cup holder portion 110 may also include an aperture 116 disposed in a bottom of the cup holder portion 110.

In an embodiment, the tube 112 extends from the cup holder portion 110 at an angle of about 60-90 degrees with respect to the cup holder portion 110, or an angle of about 60, 75, or 90 degrees with respect to the cup holder portion 110. The tube 112 may be a hollow tube. The tube 112 may include an external threaded portion 114 adapted to couple to the aperture 116 in the bottom of the cup holder portion 110. For example, the threaded portion 114 may be threaded into the aperture 116 to couple the tube 112 to the cup holder portion 110, may be welded or coupled to the cup holder portion 110 via an adhesive. In another embodiment, the threaded portion 114 may be part of the cup holder portion 110, and integrally formed therewith. In this embodiment, the tube 112, may be coupled to the threaded portion 114 via a weld or adhesive.

Figure 4:
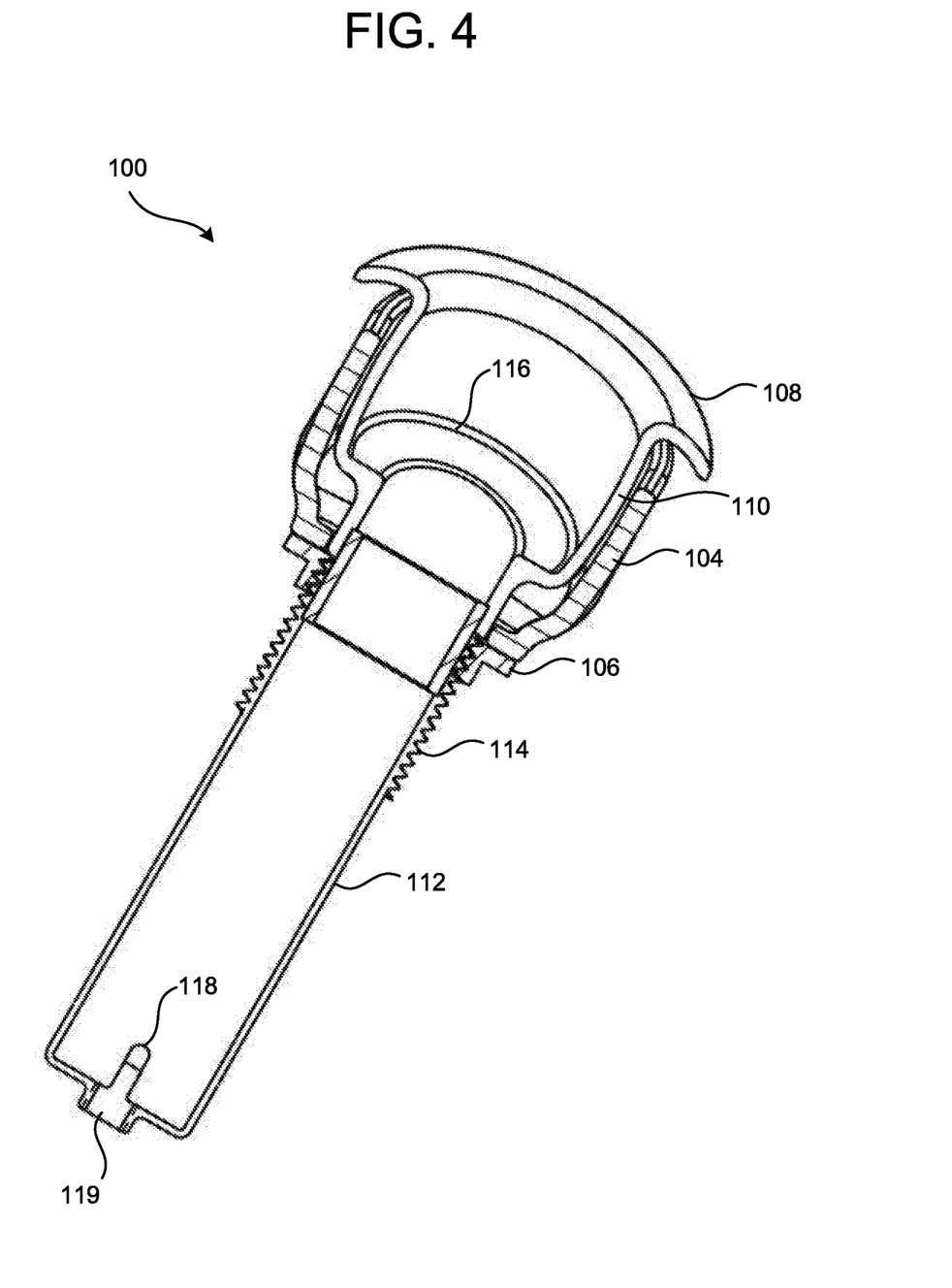
FIG. 4 is a sectional side view of the rod and cup holder according to FIG. 2.
Figure 5:
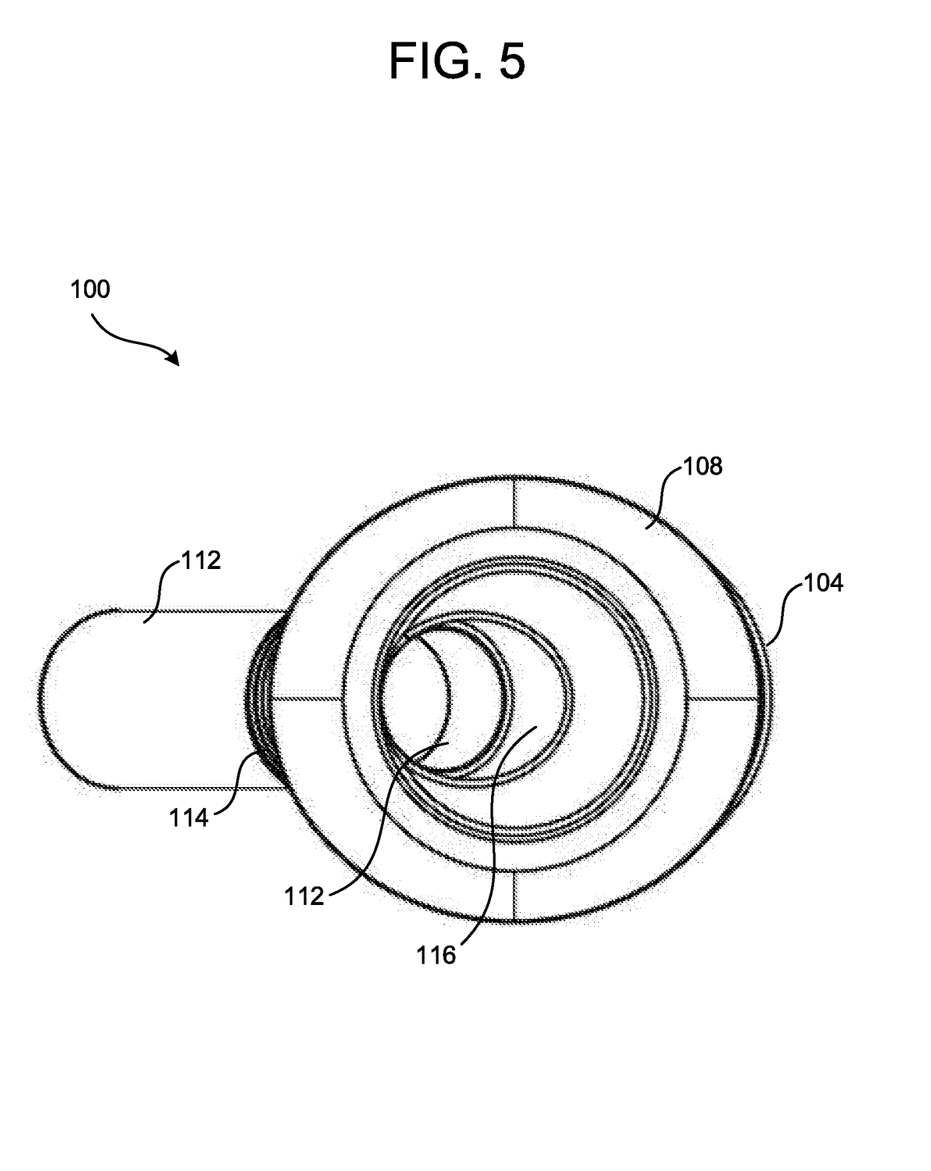
FIG. 5 is a top view of the rod and cup holder according to FIG. 2.
Figure 6:
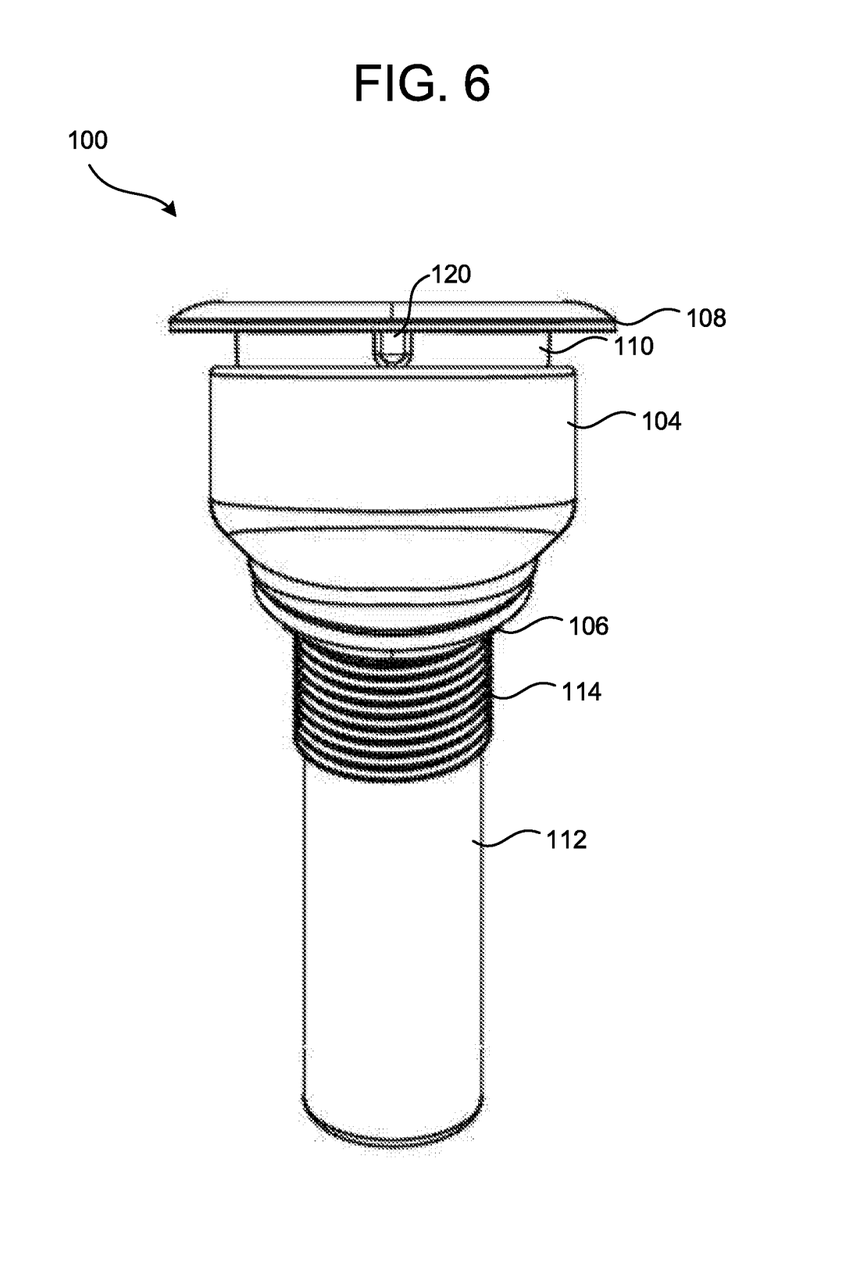
FIG. 6 is a front side view of the rod and cup holder according to FIG. 2.
Figure 7:
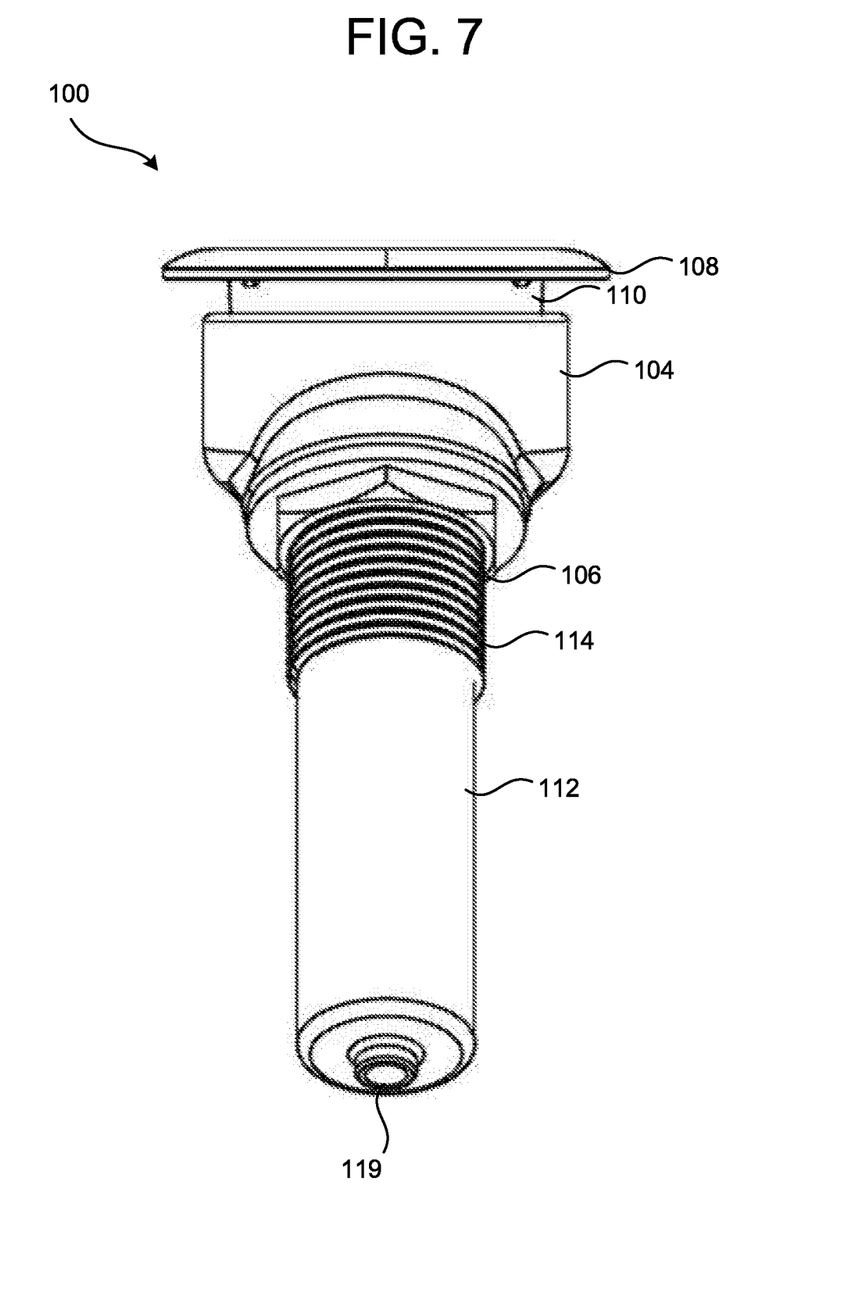
FIG. 7 is rear side view of the rod and cup holder according to FIG. 2.
Figure 8:
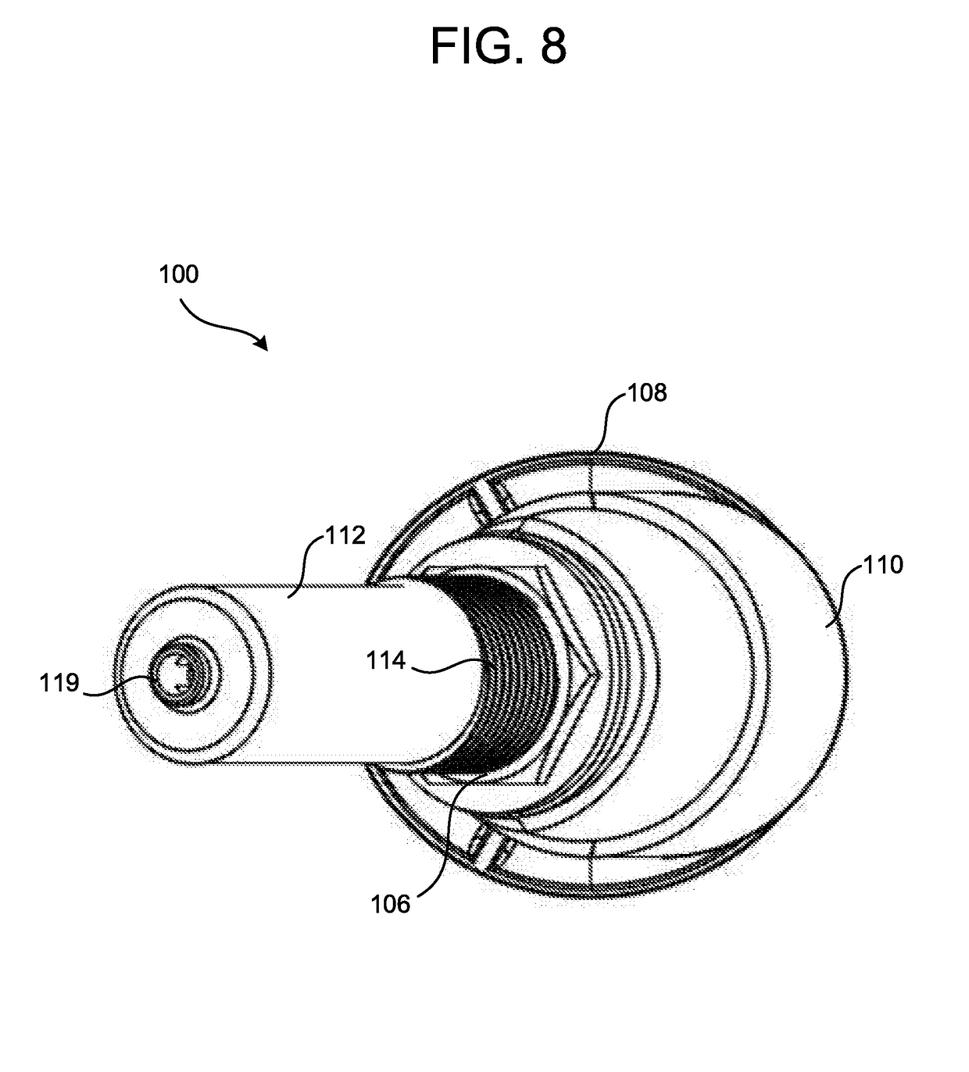
FIG. 8 is a bottom view of the rod and cup holder according to FIG. 2.

The tube 112 may include a protrusion 118 at a bottom of the tube 112 that extends into the tube 112. The protrusion 118 is adapted to stop an end of a rod, such as a fishing rod from passing through the tube 112. The protrusion 118 may bisect the interior of the tube 112 (as illustrated in FIG. 4), and be adapted to mate with a bottom of a fishing rod to prevent the fishing rod from rotating relative to the rod and cup holder 100. In an embodiment, the bottom surface of the tube 112 may include an aperture or other structure 119 that facilitates drainage of liquids from inside of the tube 112.

The aperture 116 at the bottom of the cup holder portion 110 may be oval in shape; however, the aperture 116 may have any other shape (such as circular, square, rectangular, triangular, etc.). This allows a rod disposed in the rod and cup holder 100 to be held at an angle, such as an angle extending past a side of a boat, away from the boat.

Figure 1:
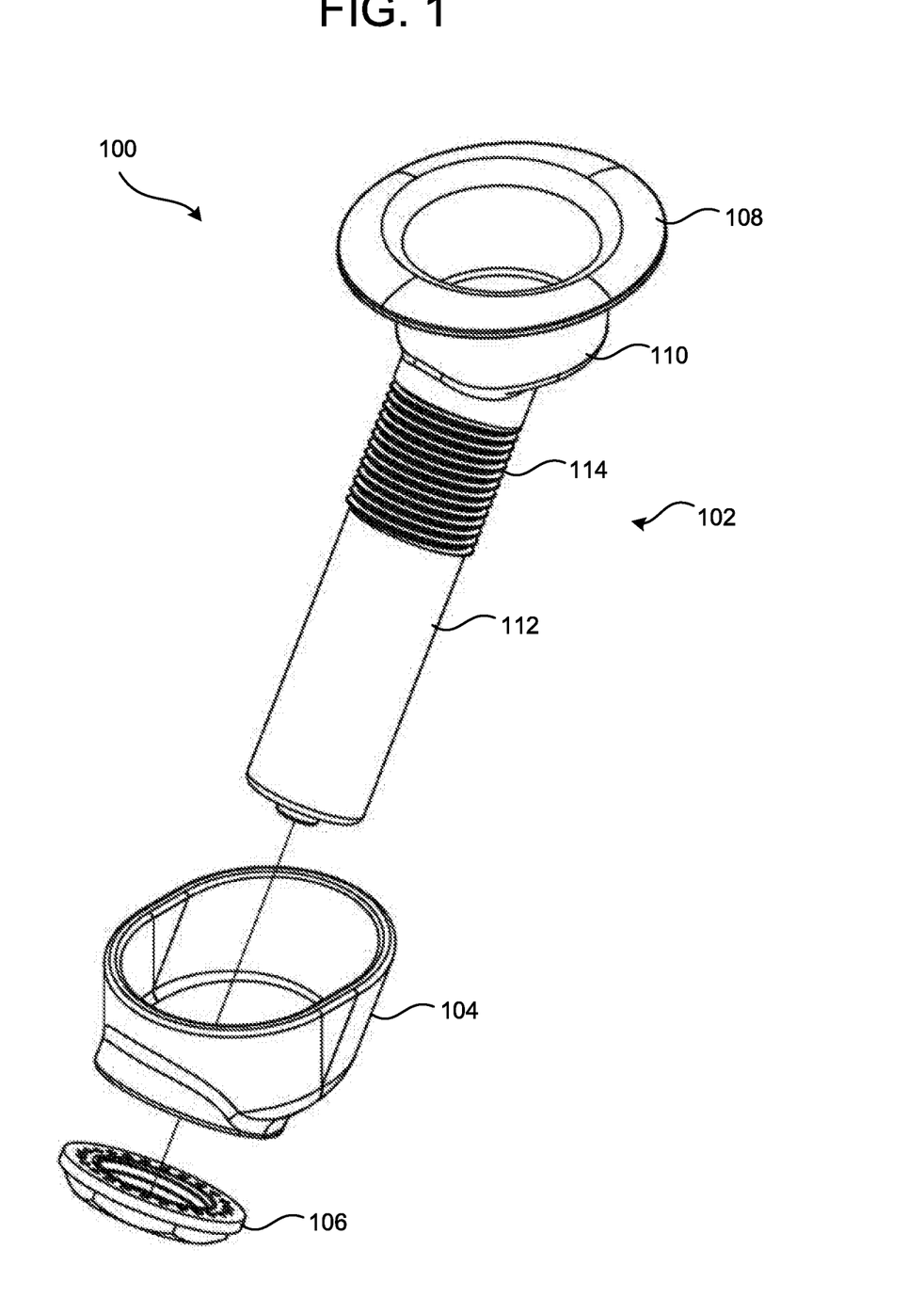
FIG. 1 is a perspective, exploded view of a rod and cup holder according to an embodiment of the present invention.
Figure 2:
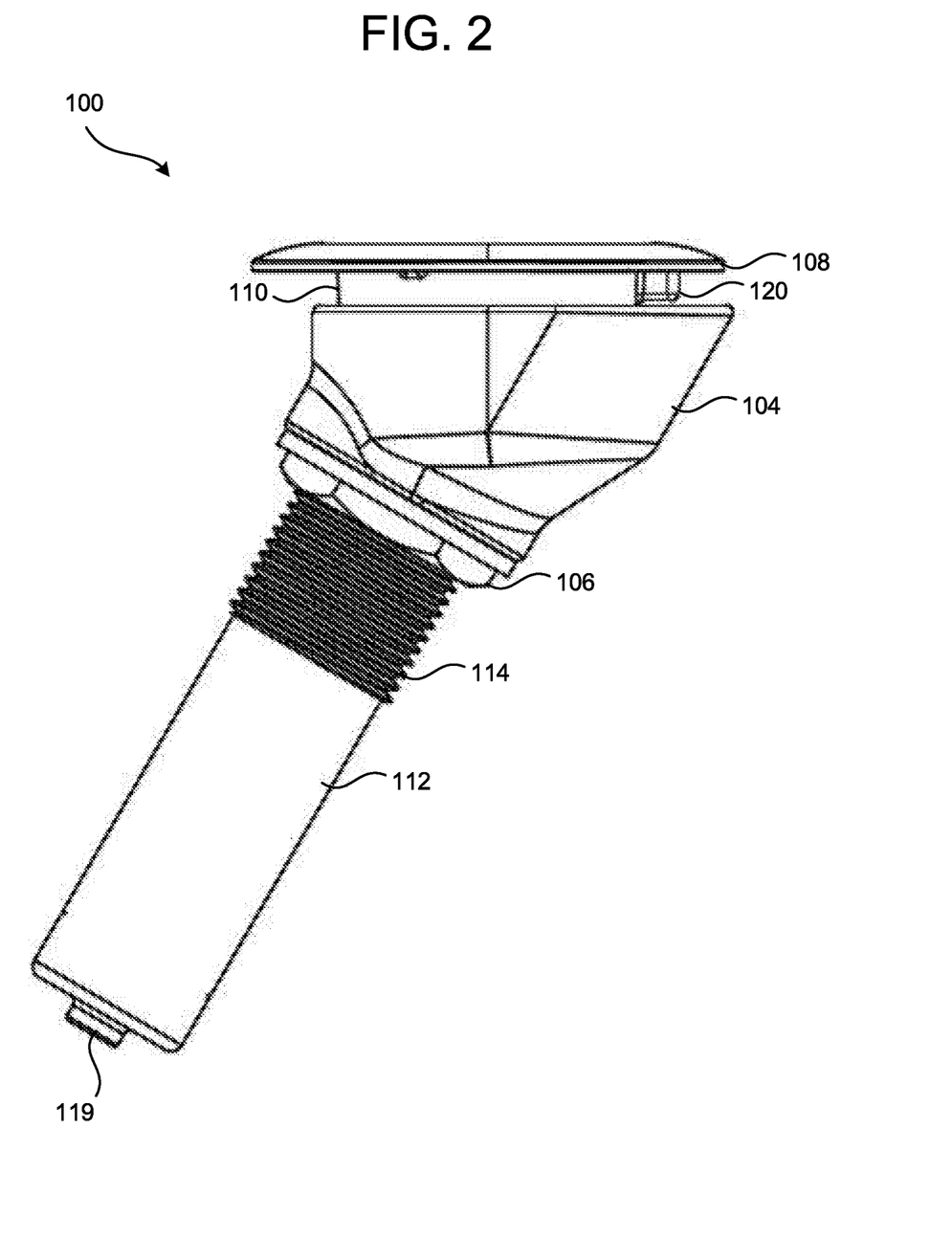
FIG. 2 is a side view of the rod and cup holder according to an embodiment of the present invention.
Figure 3:
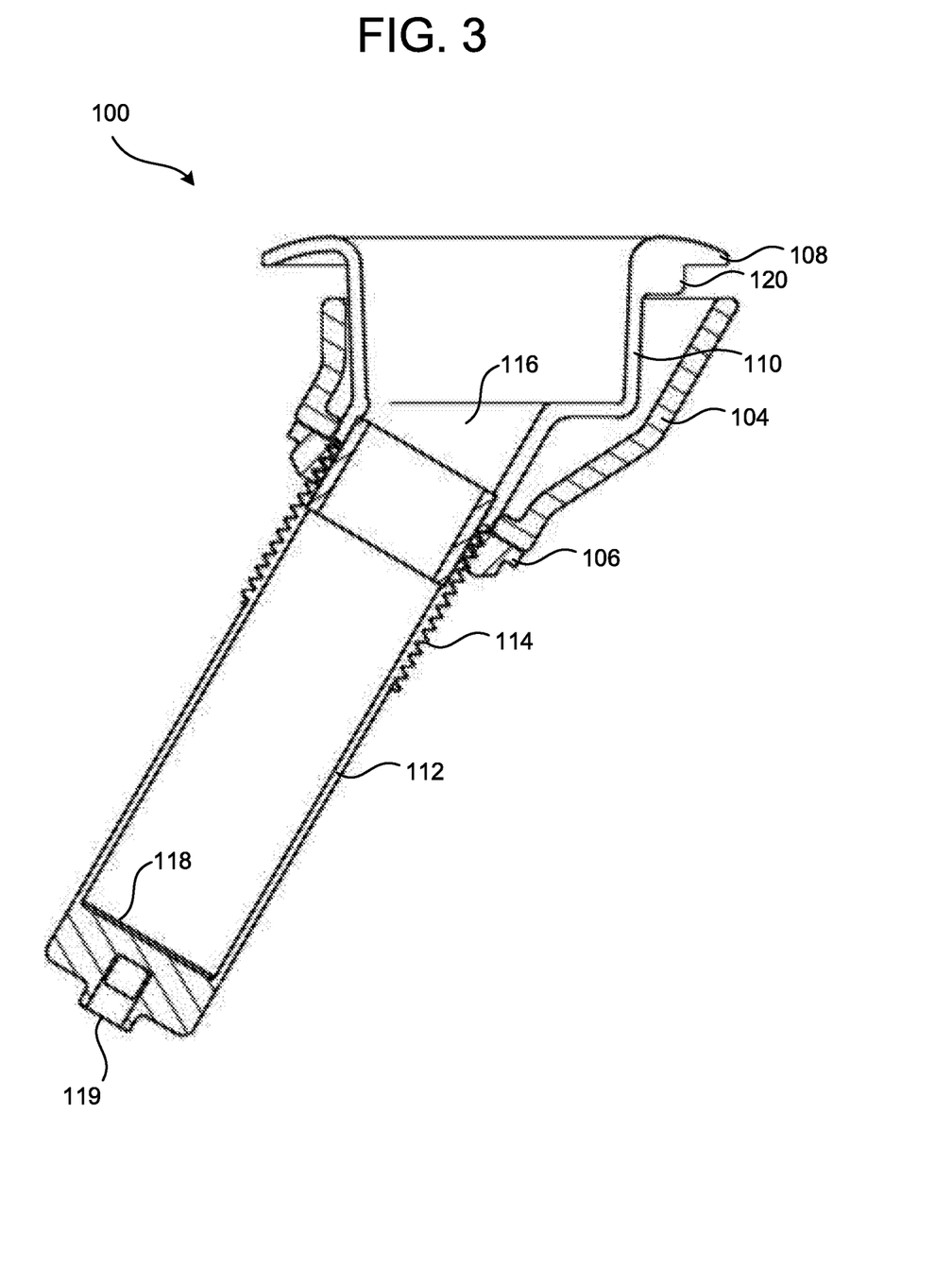
FIG. 3 is a sectional side view of the rod and cup holder according to FIG. 2.

The support 104 is adapted to slide over the tube 112 and receive the cup holder portion 110. Accordingly, the support 104 may be cup shaped, and have a shape and size corresponding to the cup holder portion 110. This allows the support 104 to receive the cup holder portion 110 and have a top edge that aligns substantially parallel with the head 108, as illustrated in FIG. 2. Once the support 108 is installed, the fastener 106 is threaded onto the threaded portion 114 of the tube 112. The top edge of the support 104 is adapted to allow a force applied along an axis of the tube to be applied to a bottom of an installation surface parallel to the head 108.

Figure 9:
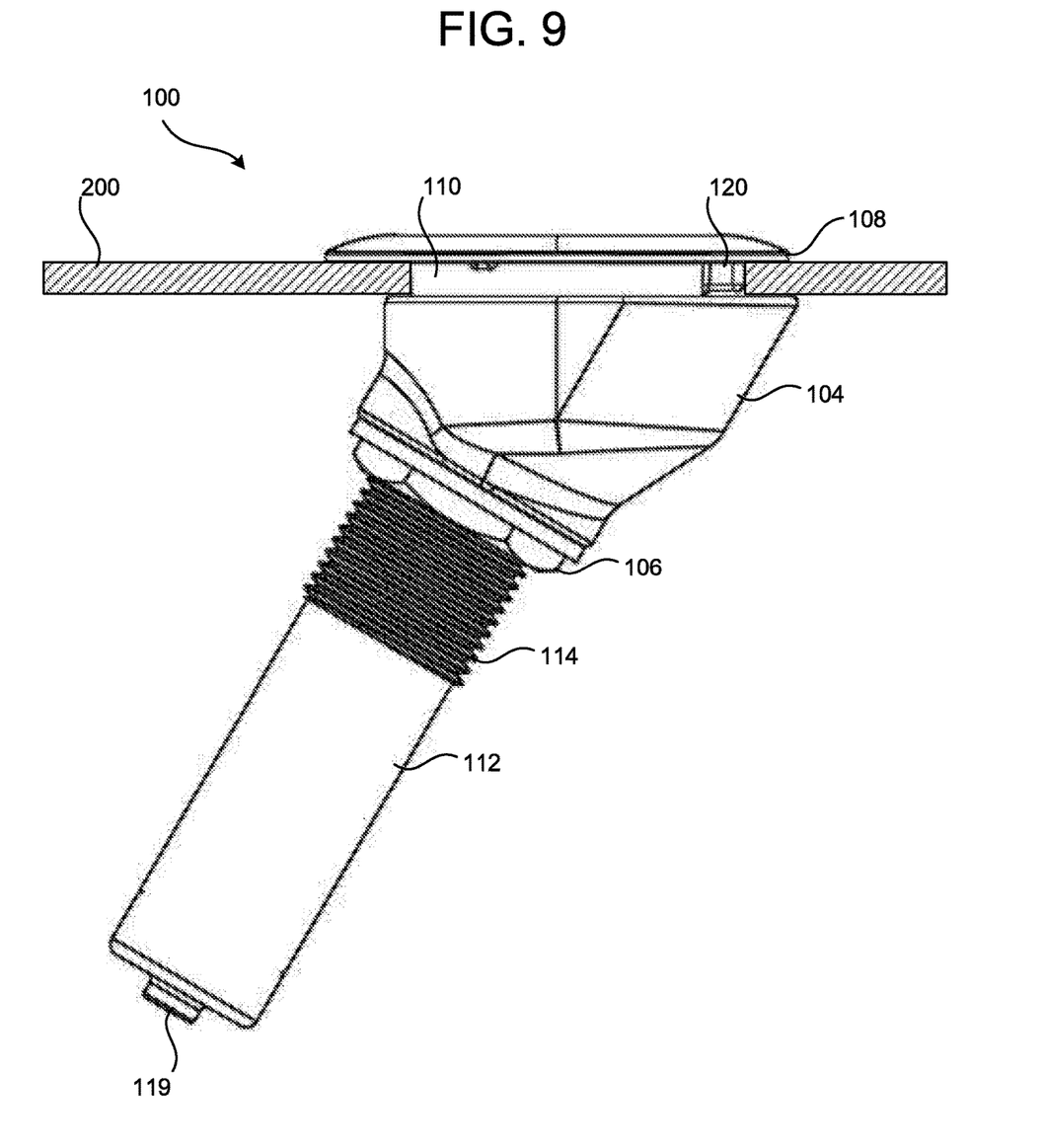
FIG. 9 is a side view of the rod and cup holder according to FIG. 2 installed in a surface.

Referring to FIG. 9, the rod and cup holder 100 may be installed in a surface 200. To install the rod and cup holder 100 in an installation surface 200, such as an edge of a sidewall of a boat, an aperture is made in the surface large enough to receive the cup holder portion 110. A notch may also be made in the surface 200 adjacent the aperture to receive a tab or protrusion 120 extending outward from an external surface of the cup holder portion 110. The tab 120 may restrict rotational movement of the rod and cup holder 100 with respect to the installation surface 200. In an embodiment, the tab 120 is disposed on the external surface of the cup holder portion 110, such that the tube portion 112 extends from the cup holder portion 110 in a direction away from the tab portion 120.

The holder portion 102 is then disposed in the aperture in the installation surface 200, with the head 108 disposed above and adjacent a top of the installation surface 200, and the cup holder portion 110 extending into the aperture in the installation surface 200. The tab 120 may also engage a notch in the installation surface 200 to restrict rotational movement of the rod and cup holder 100 with respect to the installation surface 200. The tube 112 extends from the cup holder portion 110 away from a bottom of the installation surface 200.

Once the holder portion 102 is disposed in the installation surface 200, the support 104 may be slid onto the tube 112 and receive an external surface of the cup holder portion 110. The support 104 may be disposed adjacent the bottom of the installation surface 200. The fastener 106 may then be threaded on to the threaded portion 114 to cause the support 104 to abut the bottom of the installation surface 200. The fastener 106 may be tightened to compress the head 108 and support 104 onto the top and bottom sides of the installation surface 200. This allows the rod and cup holder 100 to be used with installation surfaces with differing thicknesses.

Once installed, the rod and cup holder 100 may be used to hold a container in the cup holder portion, or a fishing rod. The fishing rod may be held in the rod and cup holder 100 by disposing an end of the fishing rod into the tube 112. This allows a cup holder to double as a rod holder and vice versa, thereby reducing a number of different types of accessories that may be installed in or around a boat. The method of installation also reduces leak points be removing any need for fasteners to be installed through the head 108 and driven into the installation surface. As illustrated, the head 108 is larger than an installation aperture, thereby covering the aperture and reducing leak points. Accordingly, a seal may be disposed between the head 108 and the top of the installation surface to provide a fluid tight seal.

As used herein, the term "coupled" and its functional equivalents are not intended to necessarily be limited to direct, mechanical coupling of two or more components. Instead, the term "coupled" and its functional equivalents are intended to mean any direct or indirect mechanical or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A rod and cup holder comprising:
    a cup holder portion including an aperture in a bottom of the cup holder portion;
    a flange coupled to an end of the cup holder portion opposite the aperture;
    a tube having a first end coupled to the cup holder portion proximal to the aperture and extending at an angle with respect to the cup holder portion;

a support including first and second openings respectively having first and second sizes, wherein the first size is smaller than the second size, the first opening is angled with respect to the second opening and adapted to receive the tube, and the second opening is adapted to receive and be disposed around an external surface of the cup holder portion; and a fastener disposed on the tube and adapted to cause the flange and support to compress an installation surface therebetween.

2. The rod and cup holder of claim 1, wherein the angle is about 60-90 degrees.

3. The rod and cup holder of claim 1, wherein the cup holder portion has a circular or oval shape.

4. The rod and cup holder of claim 1, wherein the aperture of the cup holder portion has a circular or oval shape.

5. The rod and cup holder of claim 1, wherein the cup holder portion includes an outwardly extending tab adapted to restrict rotational movement of the rod and cup holder with respect to an installation surface.

6. The rod and cup holder of claim 1, wherein the tube includes a stop surface at a second end of the tube opposite the first end.

7. The rod and cup holder of claim 1, wherein the tube includes a protrusion at a bottom surface of the tube that extends inwardly into the tube, wherein the protrusion is adapted to mate with an end of a fishing rod to restrict rotational movement of the fishing rod with respect to the rod and cup holder.

8. The rod and cup holder of claim 1, wherein the tube includes a bottom surface having a structure adapted to drain liquid from an interior of the tube.

\* \* \* \* \*